US010507605B2

(12) United States Patent
Miller et al.

(10) Patent No.: US 10,507,605 B2
(45) Date of Patent: Dec. 17, 2019

(54) METHOD AND SYSTEM OF VACUUM LOADING

(71) Applicant: Wittmann Canada Inc., Richmond Hill (CA)

(72) Inventors: Robbie Miller, Uxbridge (CA); Joseph Corturillo, Richmond Hill (CA)

(73) Assignee: Wittmann Battenfeld Canada Inc., Richmond Hill (CA)

( * ) Notice: Subject to any disclaimer, the term of this patent is extended or adjusted under 35 U.S.C. 154(b) by 95 days.

(21) Appl. No.: 15/573,982

(22) PCT Filed: Apr. 6, 2016

(86) PCT No.: PCT/CA2016/050395
§ 371 (c)(1),
(2) Date: Nov. 14, 2017

(87) PCT Pub. No.: WO2016/179691
PCT Pub. Date: Nov. 17, 2016

(65) Prior Publication Data
US 2018/0290345 A1  Oct. 11, 2018

Related U.S. Application Data

(60) Provisional application No. 62/161,427, filed on May 14, 2015.

(51) Int. Cl.
B29C 41/36 (2006.01)
B29C 31/02 (2006.01)
B29C 31/04 (2006.01)
B29B 13/06 (2006.01)
B29C 41/04 (2006.01)
B29K 105/00 (2006.01)

(52) U.S. Cl.
CPC ............ *B29C 41/36* (2013.01); *B29B 13/065* (2013.01); *B29C 31/02* (2013.01); *B29C 31/04* (2013.01); *B29C 41/04* (2013.01); *B29K 2105/251* (2013.01)

(58) Field of Classification Search
CPC combination set(s) only.
See application file for complete search history.

(56) References Cited

U.S. PATENT DOCUMENTS

| | | | | |
|---|---|---|---|---|
| 2,703,936 A | * | 3/1955 | Hut | B65D 88/70 34/168 |
| 3,217,364 A | * | 11/1965 | Genest | B01J 8/0035 141/67 |
| 3,293,003 A | * | 12/1966 | Jones, Jr. | C09C 1/58 137/98 |
| 3,558,284 A | * | 1/1971 | Wallis | C30B 11/10 117/207 |

(Continued)

Primary Examiner — Patrick M. Buechner
(74) Attorney, Agent, or Firm — McMillan LLP

(57) ABSTRACT

A method and system of vacuum loading powder used in rotational molding are provided. A loader has a hopper with a tangential inlet at the top and a discharge assembly at the bottom. A vacuum source generates a vacuum at the center of the hopper drawing air and raw material into the tangential inlet. A filter assembly between the tangential inlet and the vacuum source partially separating the air from the raw material. One or more load cells between the hopper and a platform measures an amount of raw material present within the hopper.

30 Claims, 8 Drawing Sheets

(56) References Cited

U.S. PATENT DOCUMENTS

| | | | |
|---|---|---|---|
| 3,581,955 A | | 6/1971 | Kawata |
| 3,797,707 A | * | 3/1974 | Jenike .................... B65D 88/28 |
| | | | 222/462 |
| 3,856,459 A | * | 12/1974 | Bourton ............... B65D 88/745 |
| | | | 432/58 |
| 4,397,630 A | * | 8/1983 | Meeker .................. B29C 31/02 |
| | | | 222/144.5 |
| 5,213,724 A | * | 5/1993 | Saatkamp ............... B29C 31/06 |
| | | | 264/37.32 |
| 5,979,512 A | * | 11/1999 | McGregor ............... B65B 1/32 |
| | | | 141/10 |
| 6,949,130 B1 | | 9/2005 | Grey et al. |
| 9,650,162 B2 | * | 5/2017 | Fux .................... B01F 15/0445 |
| 2003/0155452 A1 | | 8/2003 | Hegert |
| 2010/0044903 A1 | * | 2/2010 | Rhoades .................. B22F 3/26 |
| | | | 264/69 |
| 2011/0077772 A1 | | 3/2011 | Buck et al. |
| 2014/0348597 A1 | | 11/2014 | Moretto |
| 2018/0194558 A1 | * | 7/2018 | Yoshikawa ............ B65G 65/40 |
| 2019/0055079 A1 | * | 2/2019 | Nagami ................. B65D 83/06 |

\* cited by examiner

METHOD AND SYSTEM OF VACUUM LOADING

RELATED APPLICATIONS

This Applications claims priority from U.S. Provisional Application No. 62/161,427, filed May 14, 2015, the contents of which are expressly incorporated by reference in its entirety.

FIELD OF THE INVENTION

The present invention relates generally to a loader for loading particles used in a molding process. More particularly, the present invention relates to a method and system of vacuum loading and weighing powder used in rotational molding.

BACKGROUND OF THE INVENTION

Molding is the process of manufacturing by shaping liquid or pliable raw material using a rigid frame called a mold or matrix. A mold is a hollowed out block that is filled with powder (which is subsequently melted) or a liquid. Rotational molding (rotomolding) involves heating a hollow mold which is filled with a charge or shot weight of material. It is then slowly rotated causing the softened material to disperse and stick to the walls of the mold. To maintain even thickness, the mold continues to rotate during the heating phase. The mold is then cooled and the part is removed from the mold. Rotational molding machines may be a rock and roll machine, a clamshell machine, a vertical or up and over rotational machine, a shuttle machine, a swing arm machine, or a carousel machine.

The materials used in a rotational mold may be from the polyethylene family such as: cross-linked polyethylene (PEX), low-density polyethylene (LDPE), linear low-density polyethylene (LLDPE), high-density polyethylene (HDPE), and regrind. Other compounds may be polyvinyl chloride (PVC) plastisols, nylons, polypropylene, nylon, polycarbonate. In addition to plastics, other materials may be used such as: acrylonitrile butadiene styrene (ABS), acetal, acrylic, epoxy, fluorocarbons, ionomer, polybutylene, polyester, polystyrene, polyurethane, silicone, or even various foods like chocolate.

Because rotomolding primarily uses gravity to push the material into the mold, the chosen material is typically in powder form with particle sizes of sufficient refinement to enter the detailed portions of the mold. At least one problem with fine particle sizes is dust which may enter motors or other machinery in the factory resulting in jams or other issues. Furthermore, the dust presents a potential hazard to employees in the factory. The fine particles may also go to waste if they disperse into the air when they are loaded into the mold resulting in raw material losses.

Prior systems for powder loading rely on volume which can be inaccurate. A vacuum device draws up the raw material from a reservoir into a hopper. The material is then dispensed gravimetrically and/or volumetrically through a valve in the bottom of the hopper.

It is at least one object of this invention to provide a novel method and system for loading of fine particles. Other advantages are apparent to one of skill in the art on reviewing the specification and figures as presented herein.

SUMMARY OF THE INVENTION

According to one embodiment of the invention, there is provided a loader having at least one of the following: a hopper having a tangential inlet at the top and a discharge assembly at the bottom; a vacuum source generating a vacuum at the center of the hopper; the vacuum source drawing air and raw material into the inlet; a filter assembly between the tangential inlet and the vacuum source partially separating the air from the raw material; and at least one load cell between the hopper and a platform to measure an amount of raw material present within the hopper. The filter assembly may have at least one filter, whereby the filter may be constructed of a porous material coated in a non-stick coating.

According to another aspect of the invention, there is provided a method of separating air from raw material comprising: generating a vacuum at the center of a hopper; producing a cyclonic airflow around the hopper by locating an inlet approximately tangential to the hopper; and placing a filter assembly between the inlet and the vacuum.

According to yet another aspect of the invention, there is provided a process of dispensing raw material from a hopper comprising: measuring a total weight of raw material in the hopper; receiving a desired dispense weight of the raw material; and opening a dispense valve until the total weight of raw material in the hopper is reduced by the desired dispense weight. If the desired dispense weight is greater than the total weight of raw material in the hopper, then generating a vacuum within the hopper in order to draw additional raw material into the hopper.

According to another aspect of the invention, there is provided a loader comprising: a hopper having an inlet at the top and a discharge assembly at the bottom; and a vacuum source generating a vacuum at the center of the hopper; the vacuum source drawing air and raw material into the inlet. The inlet may be tangential to the hopper. The discharge assembly may comprise a cam follower and a push bar.

In another aspect of the invention, a filter assembly may be between the inlet and the vacuum source partially separating the air from the raw material. The filter assembly may have at least one filter coupled to a filter holding plate. The at least one filter may comprise a porous material coated with a non-stick coating. A plastic structure may maintain the shape of the at least one filter. A plenum assembly, having a lid for access to the filter assembly, may be between the inlet and the filter assembly.

According to yet another aspect of the invention, a blowback ring may be coupled to an air tank and a pulse valve may be between the blowback ring and the air tank.

According to another aspect of the invention, at least one load cell may be between the hopper and a platform to measure an amount of raw material present within the hopper.

According to another aspect of the invention, at least one threaded rod may be coupled between the platform and a ceiling or vertical support structure.

According to other aspects of the invention, a sub hopper assembly may be coupled below the platform funneling the raw material into an outlet hose.

The raw material may be selected from at least one of: a cross-linked polyethylene (PEX), a low-density polyethylene (LDPE), a linear low-density polyethylene (LLDPE), a high-density polyethylene (HDPE), a polyvinyl chloride (PVC) plastisols, a nylon, a polypropylene, a polycarbonate, an acrylonitrile butadiene styrene (ABS), an acetal, an acrylic, an epoxy, a fluorocarbons, an ionomer, a polybutylene, a polyester, a polystyrene, a polyurethane, a silicone, and a food product.

According to another aspect of the invention, there is provided a method of separating air from particles of a raw material comprising: generating a vacuum at the center of a hopper; producing a cyclonic airflow around the hopper by locating an inlet approximately tangential to the hopper; and placing a filter assembly between the inlet and the vacuum.

According to yet another aspect of the invention, there is provided a process of dispensing raw material from a hopper comprising: measuring a total weight of raw material in the hopper; receiving a desired dispense weight of the raw material; and opening a dispense valve until the total weight of raw material in the hopper is reduced by the desired dispense weight. If the desired dispense weight is greater than the total weight of raw material in the hopper, then generating a vacuum within the hopper in order to draw additional raw material into the hopper.

BRIEF DESCRIPTION OF THE DRAWINGS

An embodiment will now be described, by way of example only, with reference to the attached Figures, wherein.

DETAILED DESCRIPTION OF THE EMBODIMENT

While the Background of Invention described above has identified particular problems known in the prior art, the present invention provides, in part, a new and useful application for vacuum loading.

Figure 1:
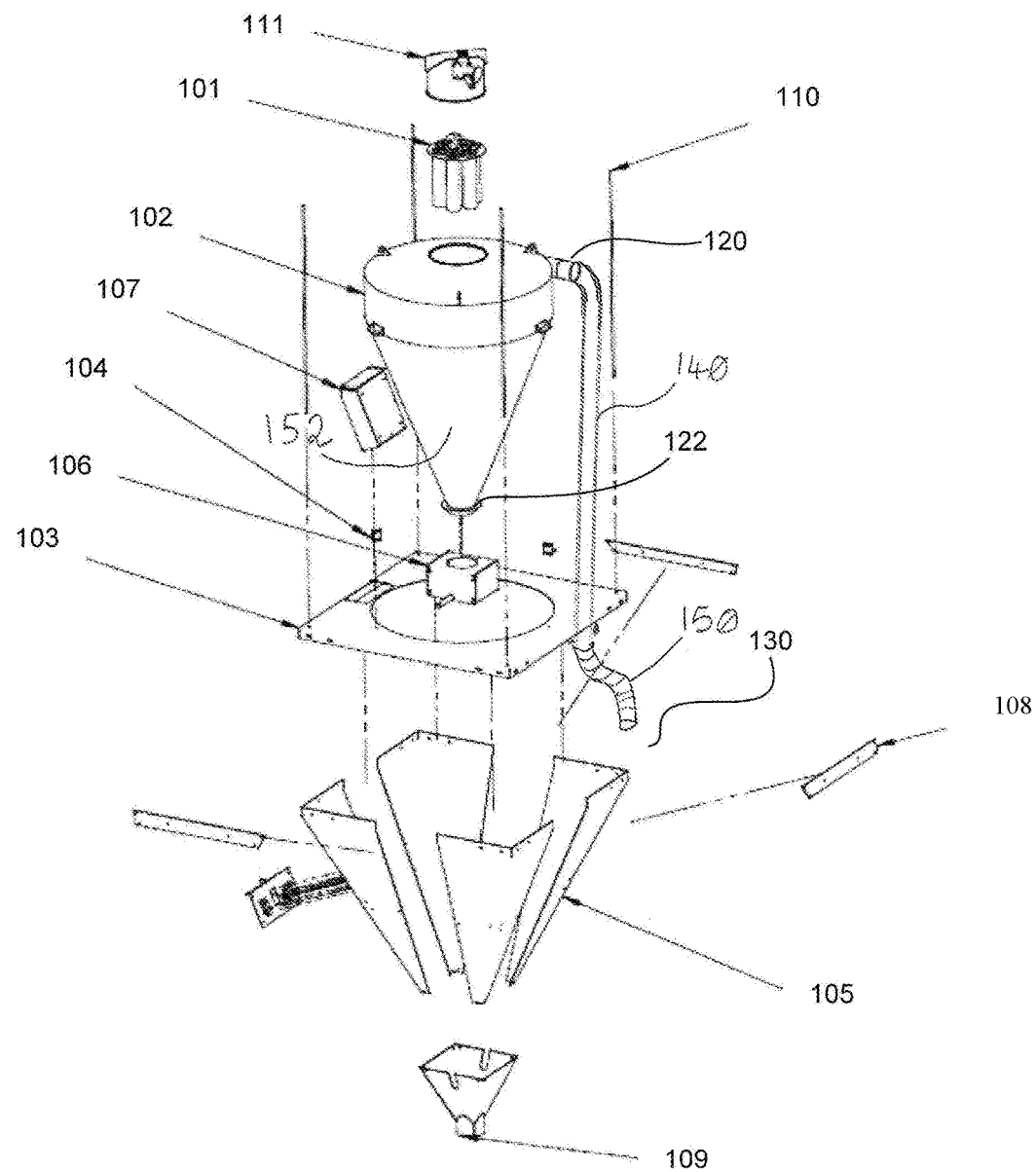
FIG. 1 shows an exploded isometric view of a loader.
Figure 2:
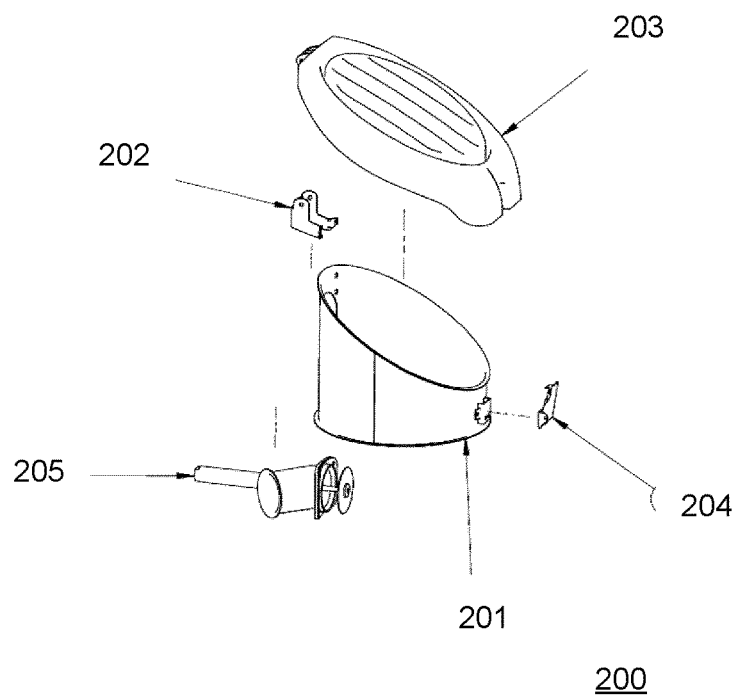
FIG. 2 shows an exploded isometric view of a clean air plenum assembly for the loader.
Figure 3:
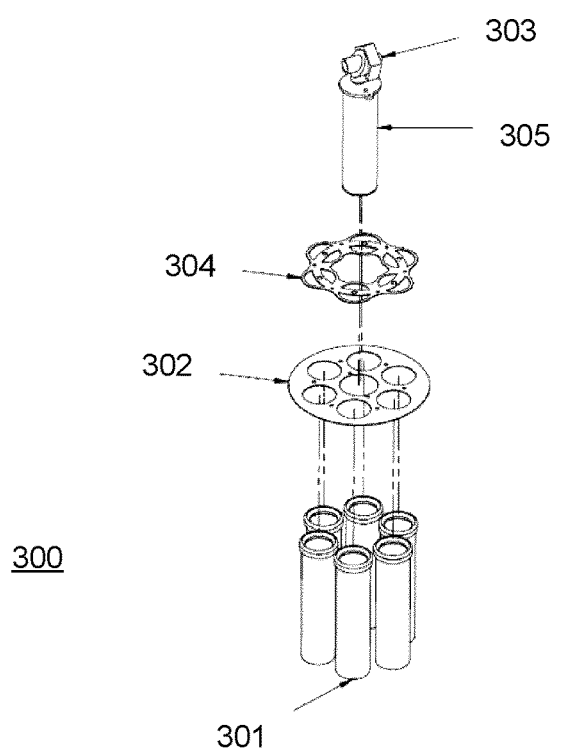
FIG. 3 shows an exploded isometric view of a filter assembly for the loader.
Figure 6:
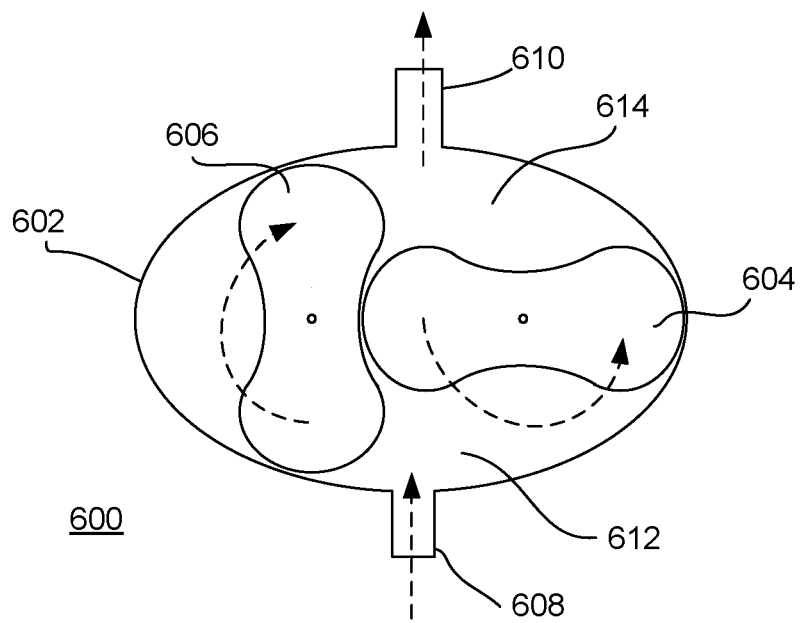
FIG. 6 shows a conceptual interior of a centralized vacuum assembly for the loader.

FIG. 1 shows an exploded view of a loader 100 for loading raw materials into a mold. A centralized vacuum 600 shown in more detail with respect to FIG. 6 is coupled to a clean air plenum assembly 111 shown in further detail in FIG. 2. The clean air plenum assembly 111 has a vacuum inlet assembly 205 which is directly connected to the centralized vacuum. The plenum assembly 111 has a housing 201 that is coupled to a lid assembly 203 by way of a hinge 202 and held in a closed position by a toggle clamp 204. The lid assembly 203 may be opened when the centralized vacuum is not in operation in order for the operator to service a filter assembly 101 shown in more detail in FIG. 3.

The filter assembly 101 comprises six filters 301 that are coupled into a filter holding plate 302. The filters 301, in this example, are constructed of felt or acrylic and coated with polyester on the exterior in order to provide a smooth surface. The smooth polyester surface on the exterior reduces the clogging of the filters 301 by the raw material. Within each filter 301 is a plastic, porous structure (not shown) that is strong enough to maintain the cylindrical shape of the filter 301 when under negative pressure in the interior of the filters 301 from the vacuum. The filter assembly 101 also comprises a blowback ring 304 that is coupled to an air tank 305 which may provide air pulses in a direction reverse to the vacuum in order to blow off any particles collecting on the exterior of the filters 301. A pulse valve (not shown) has a solenoid/diaphragm assembly to generate blowback pulses to clean the filters. The diaphragm has a small bleed hole or regulator, that allows air to pass through and keeps positive pressure on the seal. When the solenoid is energized, the bleed air is vented to atmosphere, relieving pressure on the diaphragm. The filter assembly 101 may also comprise a cyclone ring (not shown) around the filters 301 in order to deflect any particles of the raw material.

Figure 4A:
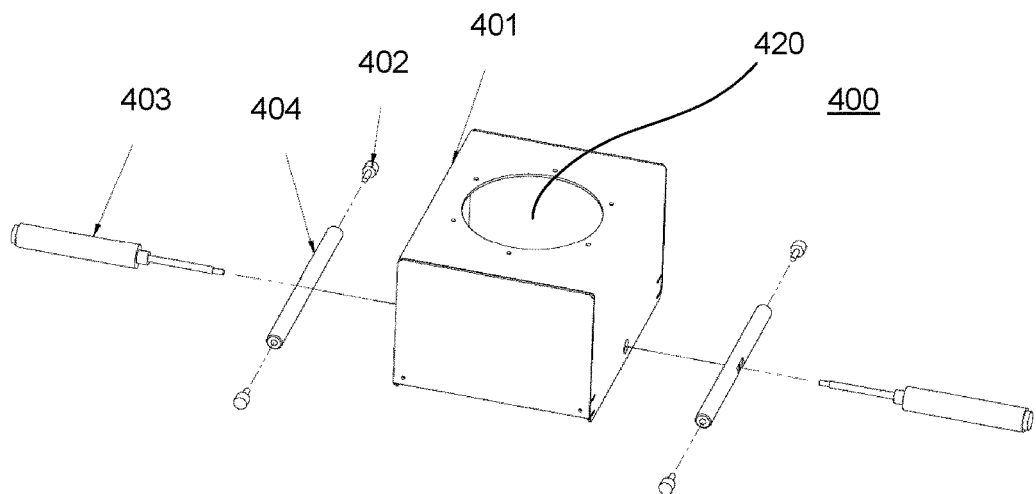
FIG. 4A shows an exploded isometric view of a discharge assembly for the loader.
Figure 4B:
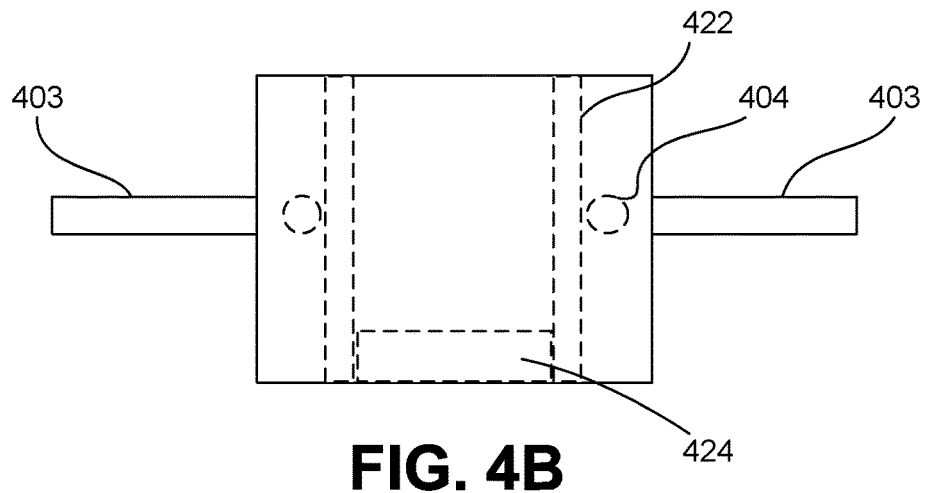
FIGS. 4B and 4C show a side plan view of the discharge assembly in an open and closed configuration.
Figure 4C:
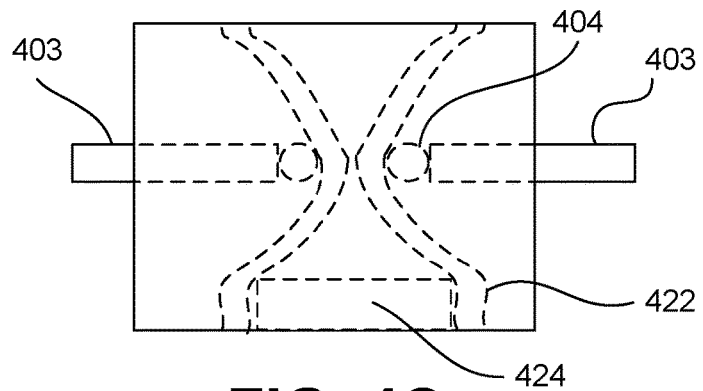
Figure 5:
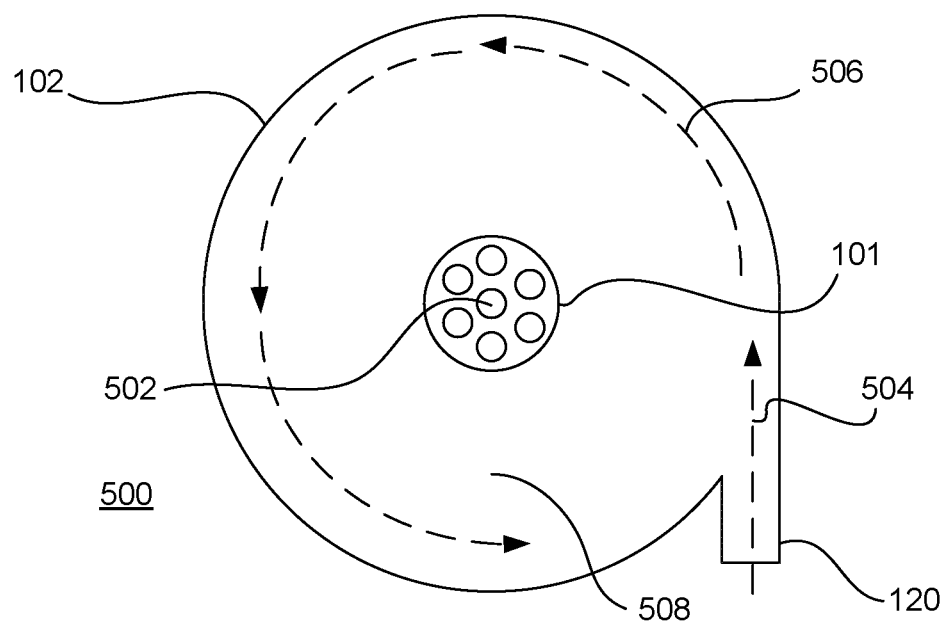
FIG. 5 is a top plan view of a main hopper demonstrating cyclone airflow.

Returning now to FIG. 1 and FIG. 5, the vacuum, by way of the clean air plenum assembly 111 and the filter assembly 101 generates a negative pressure within the center of a main hopper assembly 102 and draws raw material up a pipe 140 connected at one end to a tangential inlet 120. Air and raw material 504 enter the tangential inlet 120 and generate a cyclone effect 506 within the main hopper 102 assisting in separating the raw material from the air flow as the raw material swirls around along the wall 152 of the main hopper 102 gradually losing velocity. Raw material deposits on the wall 152 of the main hopper 102 and in particular in region 508. The main hopper 102 is fastened to three S-type load cells 104. Since the load within the main hopper 102 may be unbalanced, using three load cells 104 ensures that there is a balanced load evenly distributed among the three load cells 104. The load cells 104 are then mounted to the platform 103 holding the main hopper 102 in position. The pipe connected to the tangential inlet 120 at one end is securely fastened at the opposite end to the platform 103. A feeder hose 150 is then coupled to the fastened pipe end preventing motion of the feeder hose 150 from effecting the load cell 104 measurements. The entire weight of the main hopper 102, filter assembly 101, and plenum assembly 111 is measured by the three load cells 104. In this example, the main hopper assembly 102 has a capacity of 300 lbs. The platform 103 is connected to the roof or other vertical support structure by way of four threaded rods 110. The threaded rods 110 are of sufficient diameter to support the entire loader 100 when fully loaded. At the outlet 122 of the main hopper 102 is a discharge assembly 106 further described with reference to FIG. 4A to 4C.

The discharge assembly 106 comprises a pinch housing assembly 401 with a channel on each side (not shown). Within each channel is a cam follower 402 for each push bar 404. The cam follower 402 on each end of the push bar 404 permits the push bar 404 to freely side within the channels. A cylindrical valve actuated pneumatic cylinder 403 is mechanically coupled to each push bar 404 whereby when the cylinder is actuated, the push bars 404 move together within the pinch housing assembly 401 to be in a closed position. A hose 422 within the pinch housing assembly connected to a flange 424 and passing through hole 420, which in this example is 6" in diameter, is pinched together prohibiting raw material from passing through the pinch valve. In an open position, the raw material flows freely out the discharge assembly 106. The pneumatic cylinders 403 are controlled via a control box assembly 107 comprising a Programmable Logic Controller (PLC) that is coupled to a user interface as is further described below with reference to FIGS. 7A to 7H.

On the bottom of the platform 103 is a sub hopper assembly 130 which funnels the discharged raw material into an outlet hose (not shown). The sub hopper assembly 130 comprises four legs 105 connected together by leg support braces 108. At the base of the four legs 105 is a sub hopper nozzle 109. The outlet hose is coupled to the sub hopper nozzle 109. The sub hopper 130 allows the main hopper assembly 102 (and corresponding load measurements measured by the load sensors 104) to be isolated from any force variations generated by movement of the outlet hose.

In this example, the vacuum is generated by a centralized vacuum generator 600 further shown in FIG. 6. The centralized vacuum generator 600 comprises a housing 602 and a pair of rotating vanes 604 and 606. The housing 602 also has an inlet 608 and an outlet 610. One vane 604 rotates in a counterclockwise direction and the other vane 606 rotates in a clockwise direction. Both are rotated by way of a motor and belt or gear assembly (not shown). The rotation of the vanes 604 and 606 generates a negative pressure at 612 and a positive pressure at 614. The negative pressure 612 draws air into the inlet 608 and the positive pressure pushes air out of the outlet 610. The inlet 608 is coupled to the clean air plenum assembly 111 generating a vacuum within the plenum assembly 111.

Turning now to FIGS. 7A to 7H, screens contain information and control by way of a touch screen interface. In general, when an operator selects a numeric item such as timers, counters, etc. a numeric keypad is displayed to change the value of the item. For toggle functions such as on/off or manual operations, the operator simply selects the button on the touch-screen. Subsequent touches toggles the function through the other modes of operation. Certain screens may require a password to permit manipulation of the controls. When filling of the main hopper assembly 102 is required, the PLC controller signals the central vacuum pump controller (not shown) that a vacuum is desired. The central vacuum pump controller signals the PLC controller when a vacuum is available. The PLC controller then activates the valve inlet assembly 205 causing raw material to be drawn into the inlet 120 until the desired weight is reached. The PLC controller then deactivates the valve inlet assembly 205. The loading may be configured to be automatic where the main hopper 102 is refilled whenever the dispense weight is greater than the current weight of the material in the main hopper 102. The loading may also be configured for manual operation where the main hopper 102 is filled when the load key is pressed. For dispensing, the PLC controller dispenses a batch of raw material when the dispense key is pressed. The pinch valve opens to drop the prescribed weight out of the main hopper 102.

Figure 7A:
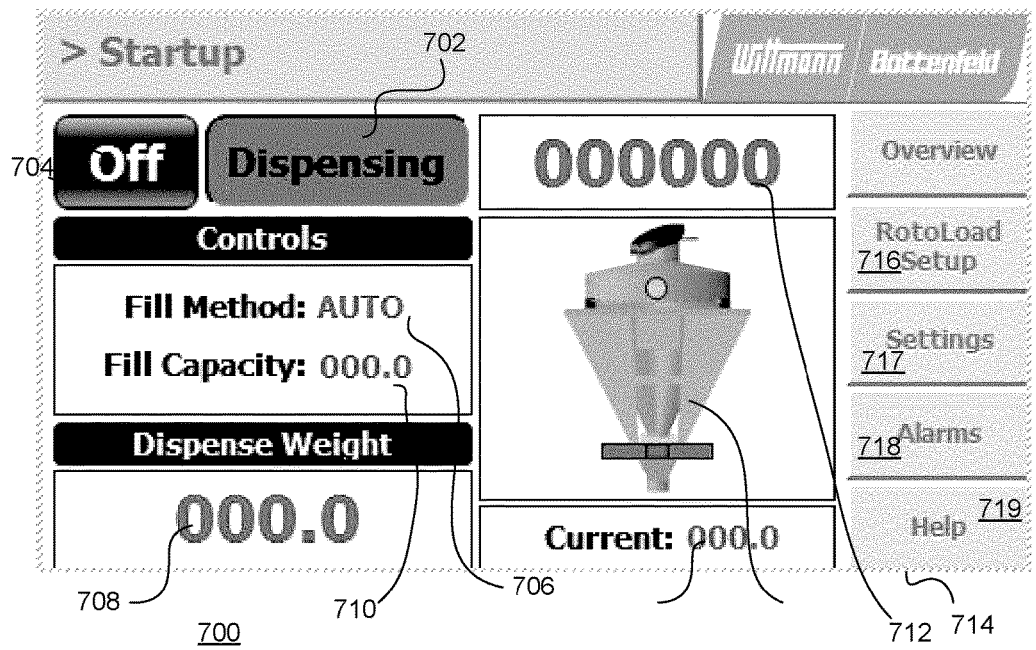
FIGS. 7A to 7H show a graphical user interface for the loader.

An example control screen 700 is presented in FIG. 7A which is in a dispensing mode as indicated by the dispensing indicator 702 but may also indicate filling, or waiting. By pressing the off button 704, the dispensing/filling operations are initiated. The fill method 706 may be set to auto where the loader 100 automatically refills when the current material weight in the loader is less than the dispense weight 708 required. Alternatively, the mode may be manual where the operator must press the F1 key to initiate filling. The fill capacity 710 is the loading setpoint weight. A unique label may be assigned to the loader by pressing the station ID field 712. Other functions may be accessed using the control bar 714 on the right hand side of the interface. The control bar 714 comprises an overview button, a RotoLoad Setup button, a settings button, an alarms button, and an online help button.

Figure 7B:
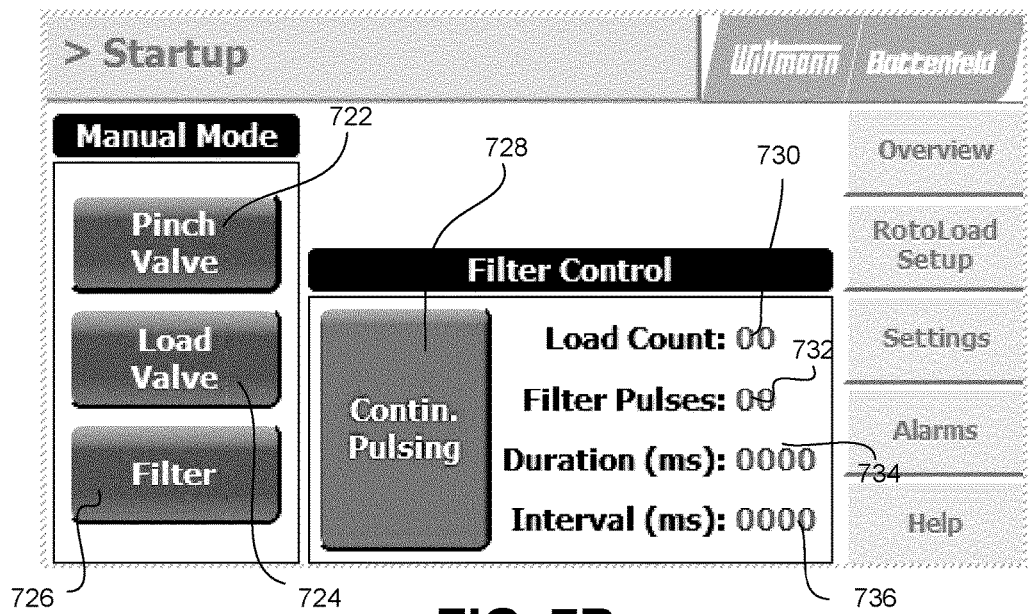

When the operator selects the RotoLoad Setup button 716, the user interface screen 720 of FIG. 7B is shown. This screen 720 is optionally password protected. The pinch valve button 722, load valve button 724, and filter button 726 turn the pinch housing assembly 401, the vacuum inlet assembly 205, and the filter assembly 101 valves on and off respectively. The Contin. Pulsing button 728 pulses the central vacuum filters 301 continuously during loading. Selecting this button toggles the mode from continuous pulsing mode to Load Count Pulsing which pulses the filters 301 after a set number of loads specified by the Load Count 730. During filter 301 cleaning, raw material is prohibited from filling the main hopper 102. The operator is also able to set the number of filter pulses 732, the duration 734 of the filter pulses in milliseconds, and the interval between the pulses 736. The value of each of these parameters is dependent on the nature of the raw material and the size of the main hopper 102.

Figure 7C:
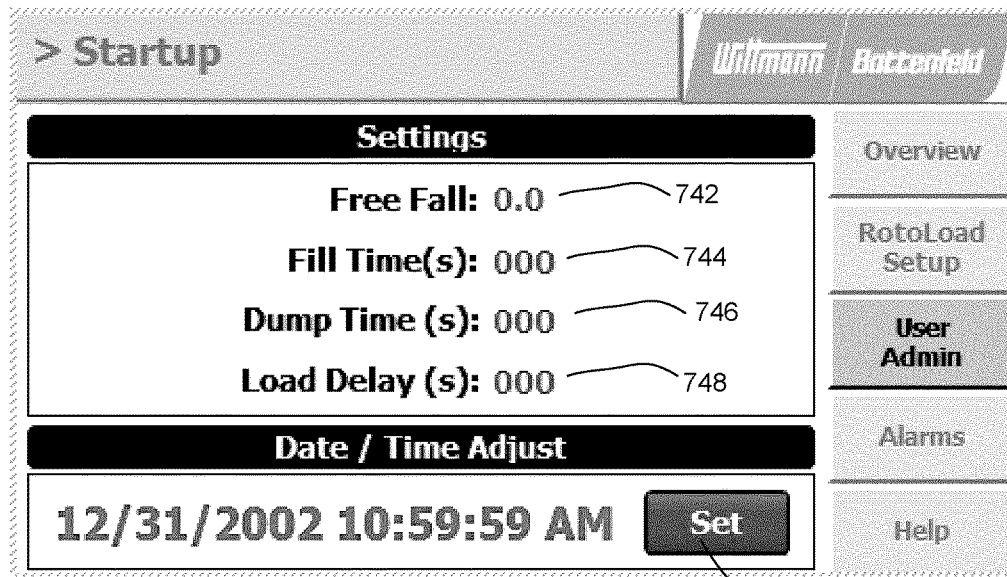
Figure 7D:
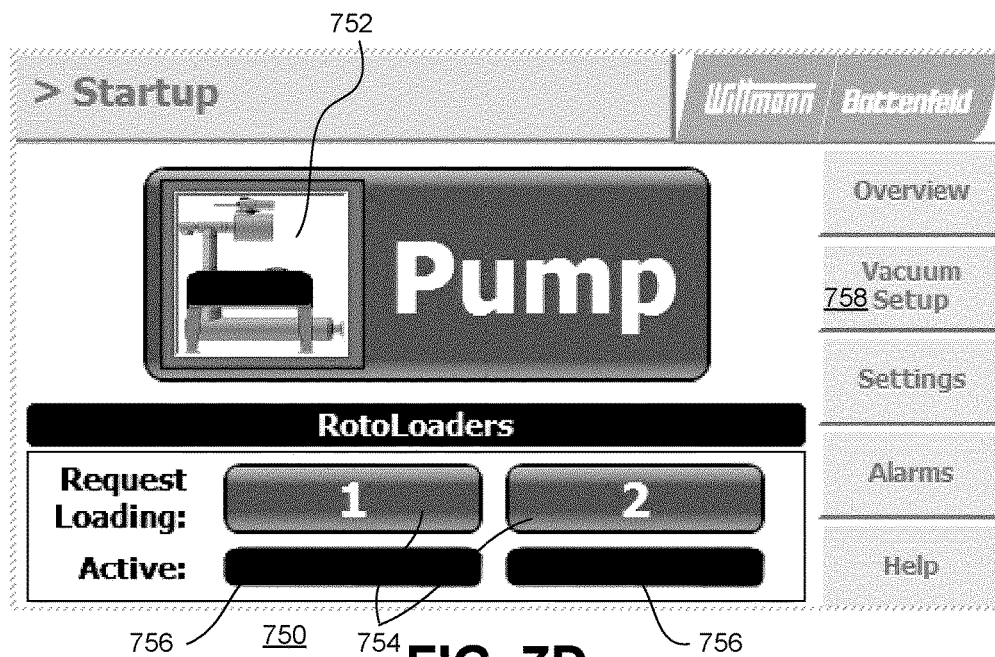

When the operator selects the Settings button 717, the user interface screen 740 of FIG. 7C is shown. The operator may set the Free Fall weight 742, which accounts for the material dropped after the pinch valve closes. The Free Fall weight 742 determines how early the pinch valve closes before the dispense weight is reached. The fill time 744 provides a warning indication on the screen if the loading takes longer than the amount of time specified by this timer. Dump time 746 provides a warning indication on the screen if dispensing takes longer than this timer. Load delay 748 allows for settling time between the fill and dump cycles when filling in Auto mode. Finally, the date and time may be set 749 to allow information recorded by the PLC controller to be time stamped.

Figure 7E:
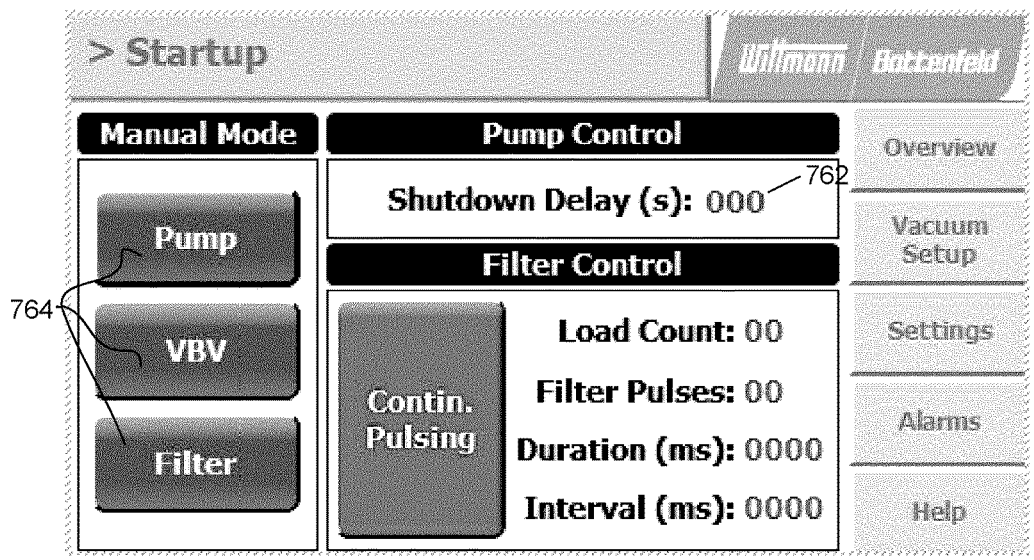
Figure 7F:
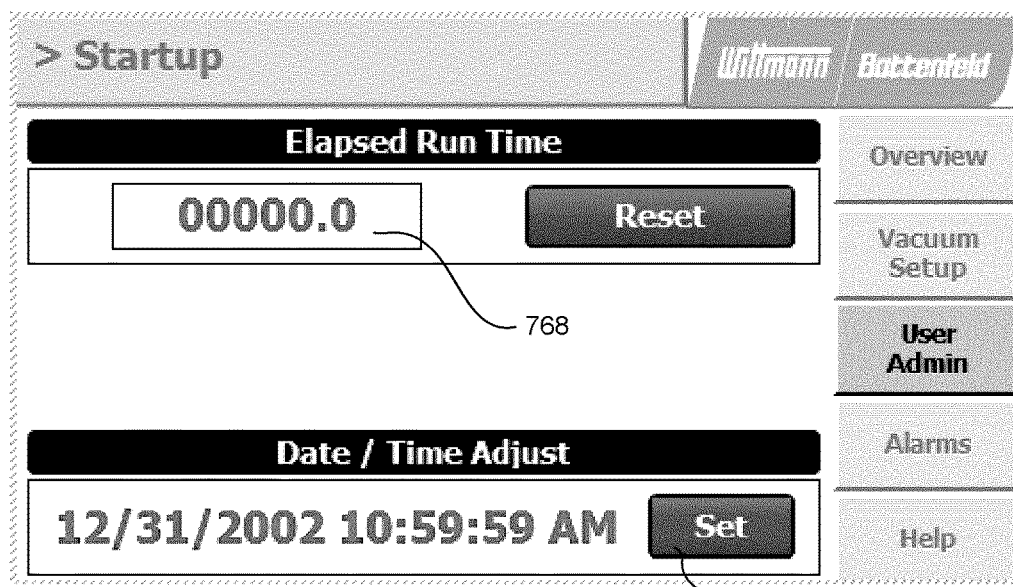
Figure 7G:
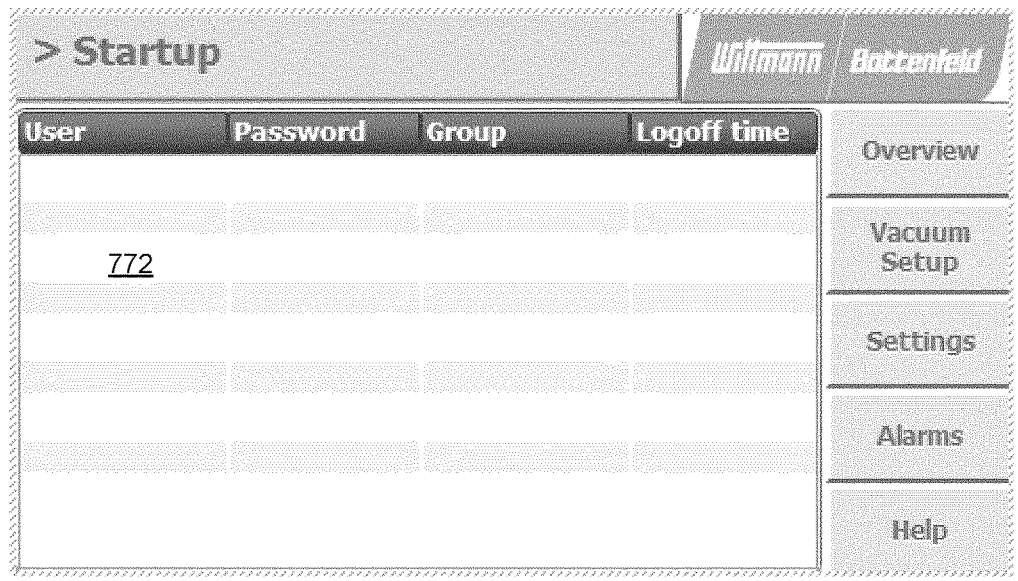

An informational screen 750 may also be shown for all loaders 100 in a facility. When the centralized vacuum pump is active, the pump indicator area 752 is surrounded by a green box. When an overload condition or other problem with the pump exists, the pump indicator area 752 is surrounded by a red box. When one of the loaders 100 is requesting loading, buttons 754 turns orange. If the loader 100 is actively filling, a green bar 756 appears indicating to the operator that the respective loader 100 is filling. When the operator selects the vacuum setup button 758, the user interface screen 760 of FIG. 7E is displayed.

The vacuum setup screen 760 displays many of the similar features of FIG. 7B with the addition of a shutdown delay 762. The vacuum setup screen 760 is used by the operator to control operation of the centralized vacuum system. The shutdown delay 762 locks out shutting down the vacuum pump in order to reduce unnecessary or erroneous cycling. The buttons 764 toggle the vacuum pump, vacuum breaker valve, and the central vacuum filter on and off manually. The operator may also display the centralized status screen 766 which displays information such as the elapsed run time 768 of the vacuum pump which may be reset by the operator. The operator may also set the date and time 749 as previously described.

The user administration screen 770 displays an operator list 772 that comprises a username, password, permissions group, and logoff time. An administrator may setup a plurality of operators with different permissions to adjust the settings of the loader 100. To add a user, the administrator selects the first blank cell under the user column and enters the new user's name followed by the Enter key. Optionally, an on-screen keyboard may be displayed for text entry. The user's security rights are selected by entering a password and selecting the appropriate security group. The logoff time is the period of inactivity before an operator is automatically logged off. An operator may be deleted by selecting a user and deleting the username.

Figure 7H:

When the operator selects the Alarms button 718, the operator may adjust or view the alarm conditions screen 780 as shown in FIG. 7H. Alarms have the highest priority in the operator interface. When an alarm condition occurs, an alarm message appears on the touch screen regardless of other system conditions. When an alarm message first appears in the alarm list 782, the operator is requested to acknowledge the displayed alarm condition. To acknowledge the alarm, the operator must push the acknowledgement button 784.

One example of an alarm is a fill/dump warning indicating the filling or dumping cycles have taken longer than expected. This alarm will not affect system functionality but may indicate a problem exists. Maintenance personnel should verify proper operation and if no problem exists, the fill/dump time setpoints should be adjusted.

Another alarm may be a pump overload fault which means the vacuum pump operation has stopped. An electrician may need to service the vacuum pump and reset the pump motor before normal operation can resume.

Another alarm is a general communications fault where the control system will not operate fully due to a disruption between the touch screen interface and the PLC controller. The system may continue to function as it was before the communication was disrupted, but no changes may be made to the system.

Although the examples described herein describe a cylindrical filter, the inventor contemplates that other types of filters may be used such as a cylindrical pleated filter. Although the filter in this example is described as a felt or acrylic material, the inventor contemplates other types of suitable filter material may be used. Moreover, although polyester is used on the exterior to provide a non-stick surface, the inventor contemplates that other types of non-stick surfaces may be used. Although the filter assembly described herein comprises six filters 301, other embodiments may have fewer or additional filters 301.

Although the examples described herein demonstrate a centrally located vacuum source, the inventor contemplates that each loader may have its own motor generating its own vacuum source.

Although the examples described herein demonstrate the main hopper assembly 102 having a capacity of 300 lbs, the inventor contemplates that other sizes are possible such as 50 lbs, 100 lbs, or 150 lbs with varying sizes of discharge orifices such as 3", 4" or other desirable size corresponding to the capacity and particle size of the raw material.

Although the example described herein shows a pinch valve in the discharge assembly 106, the inventor contemplates that other valves may be used such as a knife valves, ball valve, butterfly valves, disc valves, choke valves, gate valves, globe valves, etc.

Although the examples described herein demonstrate filling the main hopper 102 by weight, the inventor contemplates that the main hopper 102 may be filled by volume detected by one or more level sensors within the main hopper 102.

In another example, the main hopper 102 may have a wiper coupled to a motor in order to evenly distribute the raw material within the main hopper 102. In such an example, few than three load cells 104 may be required.

Although a centralized vacuum 600 is described in the examples herein, the inventor contemplates that an integral vacuum may be placed on each of the loaders 100. An although a Roots blower is described for the centralized vacuum 600, the inventor contemplates that any type of vacuum pump or vacuum generation means may be used.

Although the platform 103 is described as supported by one or more threaded rods, the inventor contemplates that the platform may be supported by chains, brackets, etc, or other type of support.

A number of implementations have been described. Nevertheless, it will be understood that various modifications may be made without departing from the spirit and scope of the invention.

The above-described embodiments are intended to be examples of the present invention and alterations and modifications may be effected thereto, by those of skill in the art, without departing from the scope of the invention, which is defined solely by the claims appended hereto.

What is claimed is:

1. A loader comprising:
   a platform;
   at least one load cell mounted to the platform;
   a main hopper connected to the at least one load cell and supported by the platform, the main hopper having an inlet and an outlet;
   a vacuum source for generating negative pressure within the main hopper thus drawing air and raw material into the main hopper via the inlet;
   a filter assembly between the inlet and the vacuum source for filtering the raw material from the air;
   a feeder means, connected to the inlet and securely fastened to the platform for drawing the raw material and the air to the inlet such that a motion of the feeder means does not affect a measurement of the weight of the main hopper by the at least one load cell;
   a discharge assembly coupled to the outlet for controlling the discharge of the raw material from the main hopper; and
   a sub hopper assembly for funneling discharged raw material to an outlet hose coupled to a nozzle of the sub hopper assembly, the sub hopper assembly being attached to a bottom of the platform such that the main hopper is isolated from any force variations generated by a movement of the sub hopper assembly or of the outlet hose.

2. The loader according to claim 1, further comprising a cyclone ring positioned around the filter assembly for deflecting particles of the raw material.

3. The loader according to claim 1, wherein the vacuum source generates negative pressure within the center of the main hopper.

4. The loader according to claim 1, wherein the vacuum source comprises a vacuum inlet assembly connected to a centralized vacuum.

5. The loader according to claim 1, wherein the at least one cell comprises three load cells.

6. The loader according to claim 1, wherein the raw material is selected from at least one of: a cross-linked polyethylene (PEX), a low-density polyethylene (LDPE), a linear low-density polyethylene (LLDPE), a high-density polyethylene (HDPE), a polyvinyl chloride (PVC) plastisols, a nylon, a polypropylene, a polycarbonate, an acrylonitrile butadiene styrene (ABS), an acetal, an acrylic, an epoxy, a fluorocarbons, an ionomer, a polybutylene, a polyester, a polystyrene, a polyurethane, a silicone, and a food product.

7. The loader according to claim 1, wherein the sub hopper assembly comprises a plurality of legs.

8. The loader according to claim 7, wherein the plurality of legs are connected together by leg support braces.

9. The loader according to claim 1, wherein the inlet is tangential to the main hopper for producing a cyclonic effect causing the raw material to swirl around along a wall of the main hopper gradually losing velocity thus assisting in separating the raw material from the air.

10. The loader according to claim 9, wherein the raw material deposits on the wall of the main hopper.

11. The loader according to claim 1, further comprising a clean air plenum assembly wherein the vacuum source is coupled to the plenum assembly.

12. The loader according to claim 11, wherein the plenum assembly has a lid assembly for allowing access to the filter assembly.

13. The loader according to claim 1, wherein the feeder means comprises a pipe and a feeder hose.

14. The loader according to claim 13, wherein the pipe is connected at one end to the inlet and secured at an opposite end to the platform.

15. The loader according to claim 14, wherein the feeder hose is coupled to the opposite end of the pipe.

16. The loader according to claim 1, wherein the discharge assembly comprises a valve movable between an open position in which the raw material flows freely therethrough, and a closed position in which the raw material is retained in the main hopper.

17. The loader according to claim 16, wherein the discharge assembly further comprises a pinch housing assembly having at least one channel on a side thereof.

18. The loader according to claim 16, wherein the valve is a pinch valve comprising a hose and wherein the discharge assembly comprises at least one push bar movable to pinch the hose thus closing the pinch valve.

19. The loader according to claim 17, wherein the discharge assembly further comprises a cam follower within the at least one channel for permitting the at least one push bar to freely slide within the at least one channel.

20. The loader according to claim 18, wherein the at least one push bar is mechanically coupled to a pneumatic cylinder whereby the at least one push bar is moved to close the pinch valve when the cylinder is actuated.

21. The loader according to claim 1, wherein the filter assembly comprises at least one filter and means for blowing off particles collecting on an exterior of the at least one filter.

22. The loader according to claim 21, wherein the means for blowing off particles comprises a blowback ring coupled to an air tank for providing air pulses.

23. The loader according to claim 22, wherein the air tank provides the air pulses in a direction reverse to the vacuum source.

24. The loader according to claim 22, wherein the filter assembly further comprises a pulse valve between the blowback ring and the air tank for generating the pulses.

25. The loader according to claim 24, wherein the pulse valve has a solenoid and diaphragm assembly.

26. A process of dispensing raw material from the loader according to claim 24, comprising:
    determining a total weight of the raw material in the main hopper based on a measurement provided by the at least one load cell;
    receiving a desired dispense weight of the raw material;
    if the desired dispense weight is greater than the total weight of the raw material in the main hopper, then activating the vacuum source for drawing additional raw material into the main hopper;
    opening the discharge assembly until the total weight of the raw material in the main hopper is reduced by the desired dispense weight;
    closing the discharge assembly before the desired dispense weight is reached based on a predetermined free fall weight; and
    activating the means for blowing off particles collecting on the exterior of the at least one filter.

27. The process according to claim 26, wherein activating the means for blowing off particles comprises activating the pulse valve between the blowback ring and the air tank for generating the pulses.

28. The process of claim 27, wherein the activating the pulse valve is done when a load count is reached.

29. The process of claim 27, wherein the activating the pulse valve is done continuously.

30. A process of dispensing raw material from the loader according to any one of claims 1 to 6 or 13 to 15, comprising:
    determining a total weight of the raw material in the main hopper based on a measurement provided by the at least one load cell;
    receiving a desired dispense weight of the raw material;
    if the desired dispense weight is greater than the total weight of the raw material in the main hopper, then activating the vacuum source for drawing additional raw material into the main hopper;
    opening the discharge assembly until the total weight of the raw material in the main hopper is reduced by the desired dispense weight; and
    closing the discharge assembly before the desired dispense weight is reached based on a predetermined free fall weight.

* * * * *